(12) United States Patent
Schneider (10) Patent No.: US 8,468,705 B2
(45) Date of Patent: Jun. 25, 2013

(54) ELECTRONIC SCALING RULER

(76) Inventor: John Schneider, Villa Hills, KY (US)

( * ) Notice: Subject to any disclaimer, the term of this patent is extended or adjusted under 35 U.S.C. 154(b) by 0 days.

(21) Appl. No.: 13/135,598

(22) Filed: Jul. 8, 2011

(65) Prior Publication Data

US 2013/0008039 A1  Jan. 10, 2013

(51) Int. Cl.
*B43L 7/00* (2006.01)

(52) U.S. Cl.
USPC .............................................. 33/494; 33/483

(58) Field of Classification Search
USPC ................... 33/494, 1 L, 403, 483, 485, 488, 33/700, 707
See application file for complete search history.

(56) References Cited

U.S. PATENT DOCUMENTS

| | | | | |
|---|---|---|---|---|
| 2,932,897 | A * | 4/1960 | Huber | 33/758 |
| 3,795,982 | A * | 3/1974 | Cunningham | 33/494 |
| 4,095,273 | A * | 6/1978 | Gonzalez | 33/700 |
| 4,143,267 | A | 3/1979 | Johnson | |
| 4,158,229 | A * | 6/1979 | Woo et al. | 33/700 |
| 4,184,261 | A | 1/1980 | Buerner | |
| 4,246,703 | A * | 1/1981 | Robinet | 33/430 |
| 4,282,571 | A * | 8/1981 | Giovannoli et al. | 33/700 |
| D271,025 | S * | 10/1983 | Li | 33/483 |
| 4,435,904 | A * | 3/1984 | Logan et al. | 33/784 |
| 4,612,656 | A | 9/1986 | Suzuki | |
| 4,839,833 | A * | 6/1989 | Parhiskari | 33/494 |
| 4,951,227 | A | 8/1990 | Todd | |
| 5,050,312 | A * | 9/1991 | McCannon | 33/700 |
| 5,647,135 | A * | 7/1997 | Fuentes et al. | 33/494 |
| 5,771,342 | A | 6/1998 | Todd | |
| 5,999,186 | A | 12/1999 | Jackson | |
| 6,091,424 | A | 7/2000 | Madden | |
| 6,205,671 | B1 * | 3/2001 | Langmaid | 33/663 |
| 6,497,051 | B1 | 12/2002 | Poole | |
| 6,816,805 | B1 | 11/2004 | Wadell | |
| 6,847,363 | B1 | 1/2005 | Sauvageau | |
| 6,992,685 | B2 | 1/2006 | Hallbauer | |
| 7,253,611 | B2 * | 8/2007 | Ma et al. | 33/708 |
| 7,631,437 | B2 * | 12/2009 | Sanderson | 33/494 |
| 7,705,861 | B2 | 4/2010 | Mielke | |
| 7,788,817 | B2 | 9/2010 | Hsu | |
| 2004/0225968 | A1 | 11/2004 | Look | |
| 2005/0007387 | A1 | 1/2005 | Abe | |
| 2006/0008779 | A1 | 1/2006 | Shand | |
| 2007/0118821 | A1 | 5/2007 | Yee | |
| 2008/0010033 | A1 | 1/2008 | Gitter | |
| 2008/0018671 | A1 | 1/2008 | Miake et al. | |
| 2008/0284800 | A1 | 11/2008 | Ross | |
| 2009/0288306 | A1 * | 11/2009 | Nahum et al. | 33/706 |
| 2009/0303254 | A1 | 12/2009 | Broms | |
| 2010/0246923 | A1 | 9/2010 | Nathaniel | |
| 2013/0008039 | A1 * | 1/2013 | Schneider | 33/494 |

FOREIGN PATENT DOCUMENTS

| | | |
|---|---|---|
| DE | 102007033519 | 1/2009 |
| EP | 0422334 A1 | 4/1991 |

* cited by examiner

*Primary Examiner* — Yaritza Guadalupe-McCall (57) ABSTRACT

A ruler has a first incremented surface, a second incremented surface, a first side surface, a second side surface, and a bottom surface. All the surfaces connect together forming the general structure of the ruler. The ruler also includes a keypad having a plurality of buttons. In one mode, the ruler measures points on scaled drawings and calculates a scaling factor from those two points. In another mode, the scaling factors are entered directly for use with scaled drawings. The ruler is particularly useful for distorted scaled drawings such as those that have been altered by electronic media.

4 Claims, 7 Drawing Sheets

ELECTRONIC SCALING RULER

BACKGROUND

1. Technical Field

The technical field is devices for use with scaled drawings particularly devices constructed like rulers.

2. Description of the Prior Art

Many past devices for use with scaled drawings were large and not simple to use. Furthermore, the circuitry and the buttons were complex requiring significant training time. Some of the devices utilized a ruler-type approach but had other shortcomings. For instance, they did not have a simple way to transfer between a mode of scale calculating to a mode of scale entering. In addition, their structure lacked useful designs such as a keypad, recessing the keypad to protect from impact damage, and having a groove along the bottom that could snag on paper scaling drawings. These scaling devices could also have trouble with scaling drawings that were distorted as they passed through electronic media. Therefore, many needs remain in this area.

SUMMARY

A ruler having a first incremented surface having markings. Also having a second incremented surface having markings. Having a first side surface connected to the first incremented surface and the second incremented surface. Having a second side surface connected to the first incremented surface and the second incremented surface. Having a bottom surface connected to the first incremented surface, the second incremented surface, the first side surface, and the second side surface. The ruler having a keypad having a plurality of buttons connected to the first side surface and the second side surface. The buttons are constructed and arranged for enabling scaling factors to be calculated in a first mode of operation and enabling scaling factors to be entered in a second mode of operation. The buttons are constructed and arranged for enabling switching between the first mode of operation and the second mode of operation by the pressing of a single button.

In another embodiment, a method for operating a first mode for calculating scaled drawings. First, placing a ruler along side of a line on a scaled drawing. Second, measuring the line based upon a first set of markings. Third, measuring the line based upon a second set of markings. Fourth, entering the result from the first set of markings and the second set of markings into a keypad. Fifth, pressing a scaling button. Sixth, outputting a final calculation.

In yet another embodiment, a method for operating a second mode for calculating scaled drawings. First, placing a ruler on a known dimension to obtain a measurement from a first set of markings and a second set of markings. Second, entering this measurement by pressing buttons on a keypad. Third, pressing an equal button on the keypad to obtain another measurement. Fourth, entering this measurement by pressing buttons on a keypad. Fifth, placing the ruler on the line to be measured obtaining a measurement from the first set of markings and the second set of markings. Sixth, entering this measurement by pressing buttons on a keypad. Seventh, pressing a proportion button. Eighth, outputting the final calculation.

DETAILED DESCRIPTION

Figure 1:
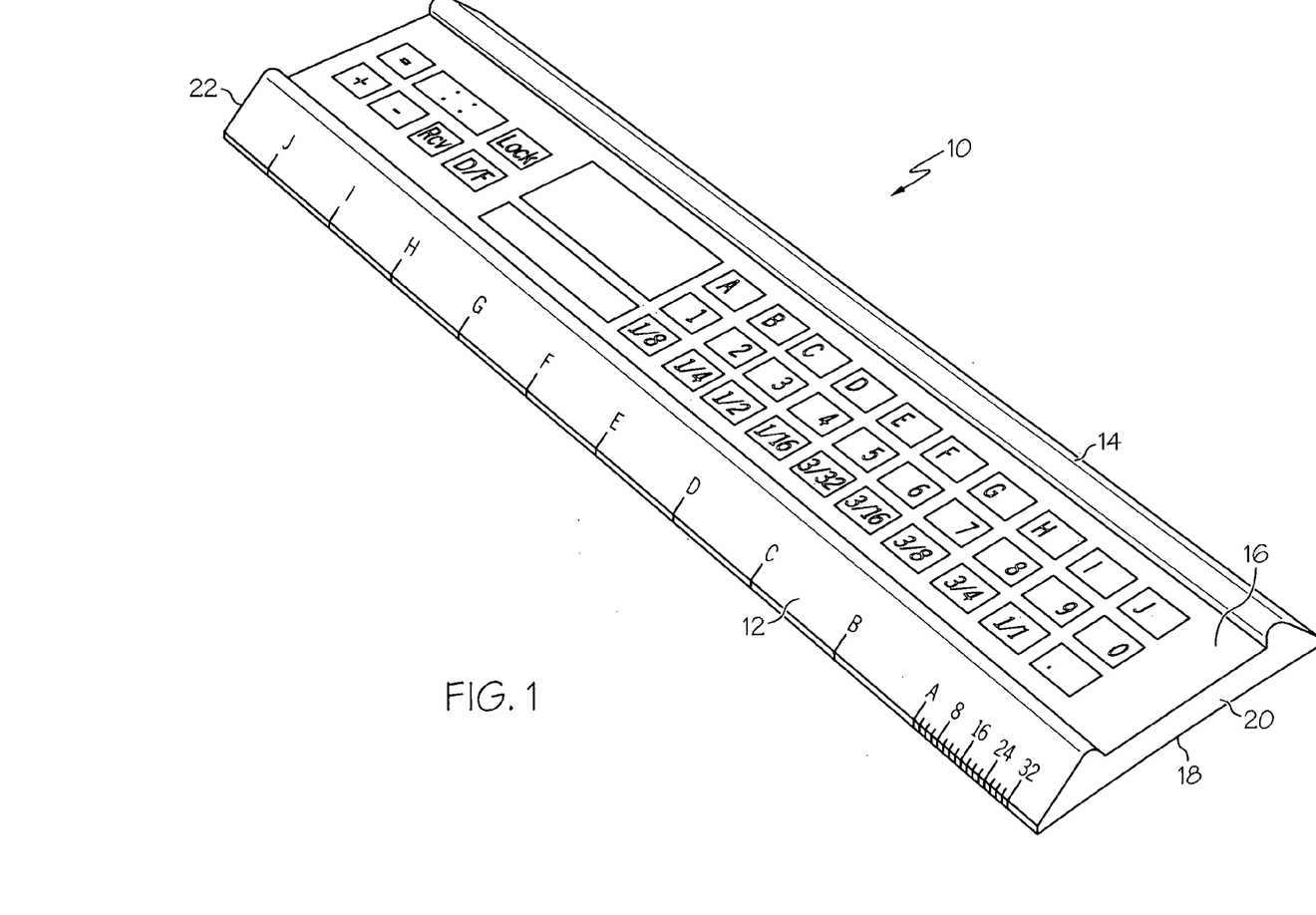
FIG. 1 is a perspective view in accordance with one embodiment of the invention.

With reference to FIG. 1, one embodiment of a ruler (10) having a first incremented surface (12), a second incremented surface (14), a keypad (16), a bottom surface (18), a first side surface (20), and a second side surface (22) is shown. In one embodiment, the ruler (10) is eleven and three-eights inches long and two and five-eights inches wide. In other embodiments, the ruler is narrower in width. The ruler (10) is approximately three-quarters of an inch high in this embodiment. In one embodiment, the ruler (10) is formed of plastic, however, other embodiments can use different materials such as metal, like aluminum, or wood, or any other material suitable to one skilled in the art.

The first incremented surface (12) and the second incremented surface (14) are positioned on either side of the keypad (16). The first incremented surface (12) and the second incremented surface (14) are used to measure scaled drawings. The user enters information about the scaled drawing into the keypad (16). In addition, the keypad (16) outputs information to the user. The bottom surface (18) supports the entire ruler (10) on whatever surface the ruler (10) is placed. The bottom surface (18) defines a concave surface. The first side surface (20) and the second side surface (22) finish out the general structure of the ruler (10).

Figure 2:
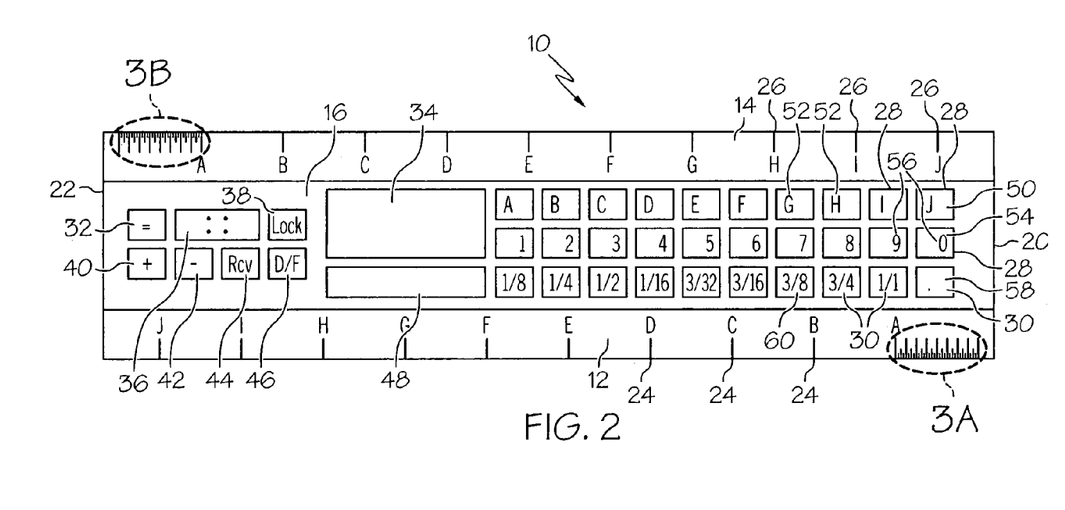
FIG. 2 is a top plan view in accordance with one embodiment of the invention.

Referring now to FIG. 2, we see that the first incremented surface (12) and the second incremented surface (14) have a plurality of first markings (24) and second markings (26). The first plurality of markings (24) are set to be one inch apart. A second set with smaller increments is discussed more robustly under FIG. 3A. The one-inch spacing is one embodiment, however, other embodiments could have a different spacing. The first and second plurality of markings (24) (26) use an alphanumeric system, however, other systems could be used in other embodiments by those skilled in the art. The second plurality of markings (26) has a section with smaller increments that is discussed in more detail in FIG. 3B.

The keypad (16) has many different buttons (28) with various functions. The buttons (28) described herein are just one embodiment and other embodiments could have buttons (28) that perform much different functions when pressed. Moreover, the current positioning of the buttons (28) on the keypad (16) is just this embodiment's positioning and other embodiments may use other positions. Furthermore, the labels (30) on the buttons (28) may vary from embodiment to embodiment and those represented here are not exclusive.

The first button (28) on the keypad (16) is the equal button (32). The equal button (32) has a function of returning a result on display (34) after entering a number of commands by pressing the other buttons (28). In addition, the equal button (32) can toggle the numerical value of a calculation to its natural value, in other embodiments. In this embodiment, the display (34) is a Light Emitting Diode (LED) display, however, other embodiments can use other displays (34) known to those skilled in the art. Another button (28) on the keypad (16) is the proportion button (36). The proportion button (36) operates to increase or decrease the magnitude of the calculated scaled distance proportional to the determined scale.

The lock button (38) holds the previous calculated scale amount for subsequent calculations. In other words, the lock button (38) allows the user to make easy use of their previous calculations with future calculations saving the user from extra steps to get the final desired calculation. For instance, in one embodiment, if the user was working in ¼ scale then A17, H21, G5, etc. could be calculated without pressing the ¼ scale button every time. The addition button (40) and subtraction button (42) accumulate entries that can be combined for total length. For example, in one embodiment, B10+C23−F13 can be combined to find the total length. The reverse program button (44) allows the ruler (10) to reverse the program so that given a total length an appropriate scale line can be drawn using the alpha/numeric number line. The decimal/fraction button (46) shifts the output on the display (34) between a decimal form and a fraction form. All of the different buttons (32), (34), (36), (38), (40), (42), (44), (46) in this embodiment have a certain position, however, in other embodiments the buttons (28) could have other positions that would be found advantageous to those skilled in the art.

The display (34) is powered by photovoltaic cells (48). The position of the photovoltaic cells (48) is next to the display (34) in this embodiment, however, the location of the photovoltaic cells (48) can vary in other embodiments. Next, in this embodiment, there is a row (50) of buttons (28) having alphabetic labels (52). This row (50) corresponds to the markings (24), (26) on the first incremented surface (12) and the second incremented surface (14). They are used in the mode where straight-line measurements are taken. Similarly, the second row (54) of buttons (28) all have numeric labels (56) which correspond to the markings (24), (26) discussed in more detail in FIG. 3A and FIG. 3B. The third row (58) of buttons (28) have labels (60) that are standard scaling factors. These are used when the ruler (10) is in the mode where scaling factors are entered directly.

Figure 3A:
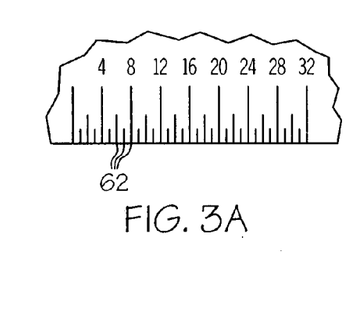
FIG. 3A is a detailed view of one set of increments in accordance with one embodiment of the invention.
Figure 3B:
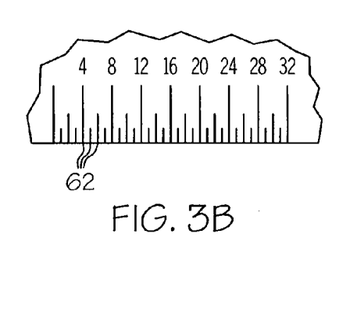
FIG. 3B is a detailed view of another set of increments in accordance with one embodiment of the invention.

Referring now to FIG. 3A, an exploded view of FIG. 2 is illustrated focusing on the section between the "A" marking (24) and the first side surface (20). Similarly, FIG. 3B depicts an exploded view of FIG. 2 focusing on the section between the "A" marking (26) and the second side surface (22). In both of these figures, the 1 inch distance from the "A" marking (24), (26) to the first or second side surface (20), (22) is divided into additional markings (62). In the illustrated embodiment, the distance from the "A" marking (24), (26) to the first or second side surface (20), (22) is 1 inch, however, in other embodiments a different measurement can be used. Moreover, in the illustrated embodiment the markings (62) are divided into increments of one thirty-second of an inch, but other embodiments can use different increments. Having the markings (62) is very advantageous because smaller distances can be measured and scale factors determined. For instance, when scaled documents pass through electronic media such as e-mail, facsimile, and the like the scale of the documents can change and even become distorted. Having markings (62) that can measure small increments can prove to be very helpful in such a situation.

Figure 4:
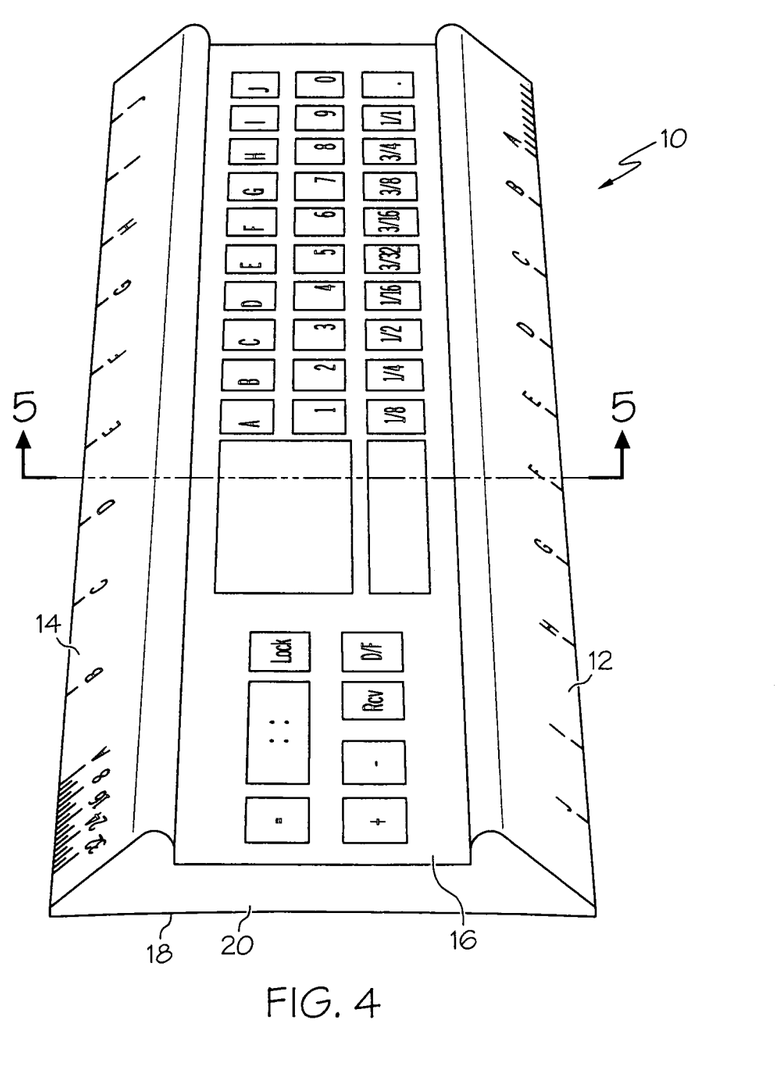
FIG. 4 is a front elevational view in accordance with one embodiment of the invention.

Referring now to FIG. 4, we have a front elevational view of the ruler (10). This view clearly shows that the bottom surface (18) of the ruler (10) is concave and continuous along its entire surface area. This is advantageous for the user because it prevents slipping and snagging of the ruler (10) when it is placed on an item for scaling. Having a square groove or other type of indentation on the bottom surface (18) could cause it to snag as the ruler (10) is slid from place to place on the item for scaling.

Figure 5:
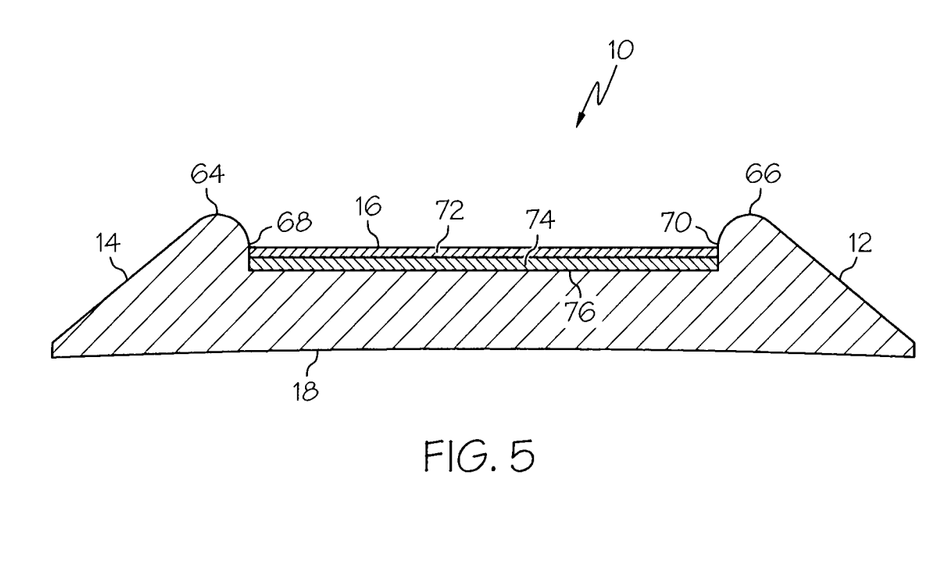
FIG. 5 is a cross sectional view of FIG. 4 in accordance with one embodiment of the invention.

Referring now to FIG. 5 which is a cross section taken through FIG. 4. FIG. 5 illustrates that there are a first top surface (64) and a second top surface (66) defined by the ruler (10). The first top surface (64) and the second top surface (66) are rounded in this embodiment of the invention, but can have different structure in different embodiments of the invention. Moving in a downward fashion are a first ledge surface (68) and a second ledge surface (70). These ledges (68), (70) provide a very important function. They position the keypad (16) guard (72) and the electronic components (74) well below the top surfaces (64) and (66). This provides protection from wear and tear of the keypad (16) as the ruler is being used. The electronic components (74) are resting securely on the support surface (76) preventing malfunction. For instance, if the ruler (10) were dropped neither the keypad (16) nor the electronic components (74) would take full impact.

Figure 6:
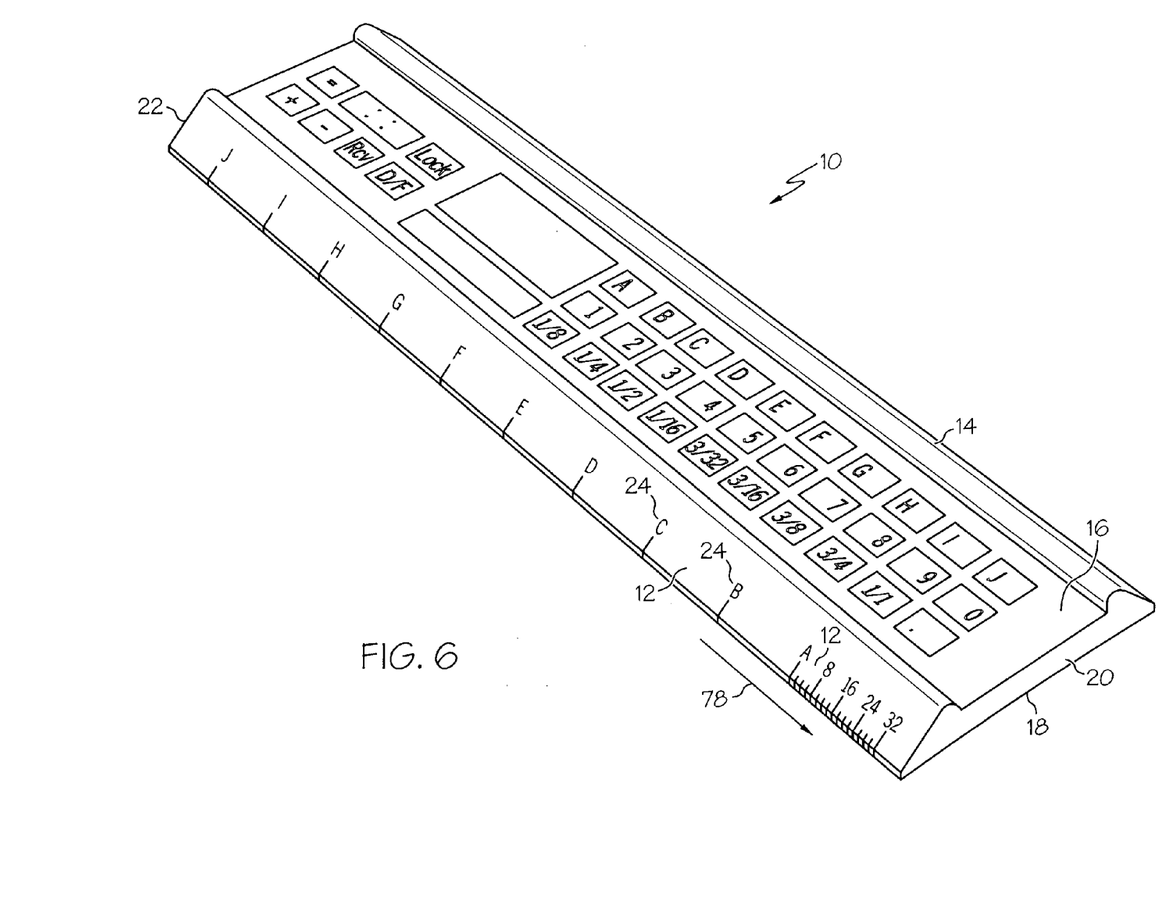
FIG. 6 is a perspective view of the ruler measuring a line on a scaled drawing.
Figure 7:
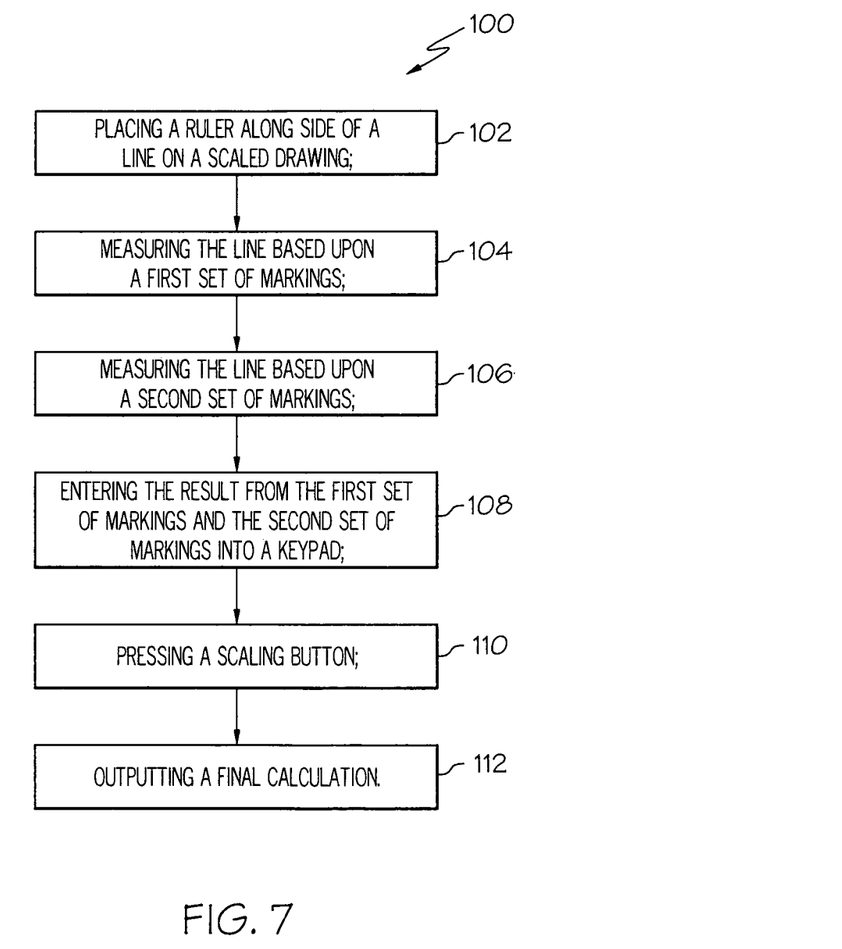
FIG. 7 is a schematic of the steps taken in a first mode of operation.
Figure 8:
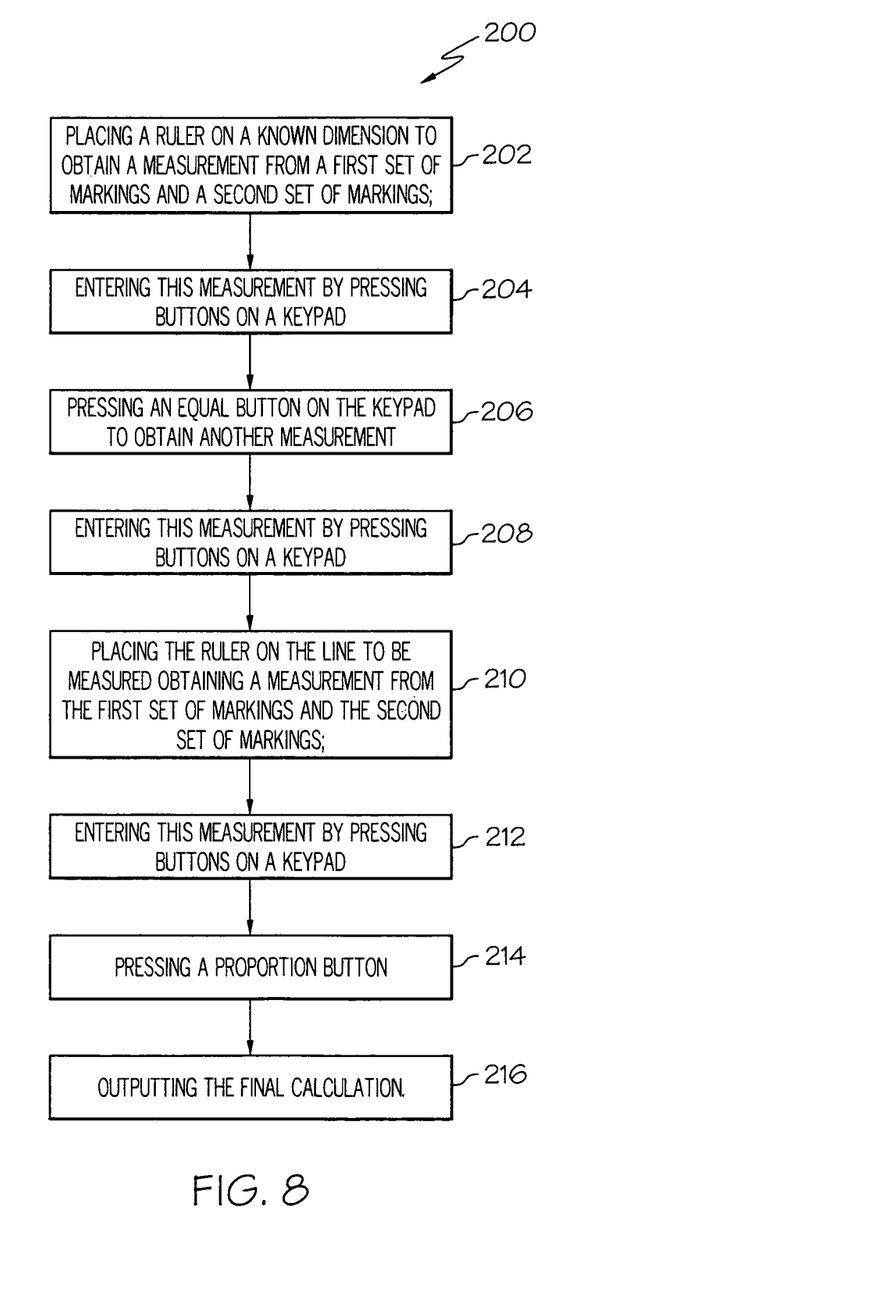
FIG. 8 is a schematic of the steps taken in a second mode of operation.

Referring now to FIGS. 6-8, in one embodiment, the ruler (10) operates by basing the initial scaling so that 1 inch is equal to 1 foot. The first incremented surface (12) and the second incremented surface (14) markings (24) (26) create an alpha-numeric line spaced in 1 inch increments for the alpha markings and fractions for numeric markings. In this embodiment, the following letters are assigned values A=0, B=1, C=2, D=3, E=4, F=5 etc. In addition, in this embodiment, the numbers are assigned the following values 1=1/32, 2=1/16, 3=3/32, 4=1/8, etc. Therefore, to operate the ruler (10) the ruler (10) is placed along side the line (78) to be measured so that one end rests on a letter and the other end falls on or between the number 1 and 32. In this embodiment, the letters and numbers are added together to obtain the final calculation. For example, in this embodiment, a line that has the points B & 16, or B16, has the value of 1+16/32 or 1.5. D3 would be 3 & 3/32. H20 would be 7 & 5/8.

Referring back to FIG. 7-8, the general operation of the embodiment is described, however, there are two modes of operation. FIG. 7 describes the first mode of operation and FIG. 8 describes the second mode of operation.

Referring to FIG. 7, the first mode (100) uses the standard scale buttons (58) having the standard scale labels (60). The first step (102) is placing the ruler (10) along side a line (78) on a scaled drawing. The second step (104) is measuring the line based upon a first set of markings (24). The third step (106) is measuring the line, based upon a second set of markings (26). The fourth step (108) is entering the result from the first set of markings (24) and the second set of markings into a keypad (16). For example, a letter would be entered followed by a number, for instance, B1. The fifth step (110) is pressing the desired scaling button (58) with the appropriate scale label (60). The sixth step (112) is outputting a final calculation. For example, the number calculated by B1 would be divided by the scale factor of the scale button (58) resulting in the final desired calculation.

Referring now to FIG. 8, the second mode (200) is used when a line scale cannot be found, is distorted, or otherwise cannot be scaled using standard scales. In order to use, a known dimension must be given so that a scale can be obtained. Generally this is the case since a drawing will have one dimension even if out of scale. The first step (202) is placing a ruler (10) on a known dimension to obtain a measurement from a first set of markings (24) and a second set of markings (26). In one embodiment, the corresponding alphanumeric value, for example is B16. Second (204), enter the measurement by pressing buttons (28) on a keypad (16). Third (206), pressing the equal button (32) on the keypad (16) to obtain another measurement. For example, enter B16 and then enter the equal button (32) and then enter the value provided by pressing the equal button (32). This toggles the numerical value provided to its natural value. Fourth (208), enter this measurement by pressing buttons (28) on a keypad (16). Fifth (210) place the ruler (10) on the line to be measured obtaining a measurement from the first set of markings (24) and the second set of markings (26). Sixth (212), enter this measurement by pressing buttons (28) on a keypad (16). Seventh (214) press the proportion button (36). Finally, (216) the final calculation is output to the display (34).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for calculating scaled drawings for standard scale drawings using a ruler comprising:
   placing a ruler along side of a line on a scaled drawing;
   measuring the line based upon a first set of markings;
   measuring the line based upon a second set of markings;
   entering the result from the first set of markings and the second set of markings into a keypad;
   pressing the desired scaling button with the appropriate scale label;
   outputting a final calculation by:
     taking a set of measurements from the entered result from the first set of markings and the second set of markings; and
     dividing the set of measurements by the scale factor of the scaling button.

2. The method of claim 1, wherein the first set of markings and second set of markings are alphanumeric.

3. A method for calculating scaled drawings when a line scale cannot be found, distorted, or otherwise cannot be scaled using standard scales, comprising:
   obtaining a known dimension;
   placing a ruler on the known dimension to obtain a first measurement from a first set of markings and a second set of markings;
   pressing measurement buttons on a keypad to enter the measurement from the first and second set of markings;
   toggle an equal button on the keypad to drive the numerical value provided by pressing the measurement buttons to its natural value;
   pressing measurement buttons on a keypad to enter the natural value;
   placing the ruler on the line to be measured obtaining a second measurement from the first set of markings and the second set of markings;
   pressing measurement buttons on a keypad to enter the values obtained from placing the ruler on the line to obtain the second measurement;
   pressing a proportion button to calculate a proportion between the natural value and the second measurement; and
   outputting a final calculation to a display.

4. The method of claim 3, wherein the first set of markings and the second set of markings are alphanumeric.

* * * * *